US009319731B2

(12) United States Patent
Lindquist (10) Patent No.: US 9,319,731 B2
(45) Date of Patent: Apr. 19, 2016

(54) METHODS AND APPARATUSES FOR RESUMING PAUSED MEDIA (75) Inventor: Jan Erik Lindquist, Älvsjö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 81 days.

(21) Appl. No.: 14/001,563

(22) PCT Filed: Sep. 5, 2011

(86) PCT No.: PCT/SE2011/051067
§ 371 (c)(1),
(2), (4) Date: Aug. 26, 2013

(87) PCT Pub. No.: WO2012/118420
PCT Pub. Date: Sep. 7, 2012

(65) Prior Publication Data
US 2013/0332977 A1 Dec. 12, 2013

Related U.S. Application Data (60) Provisional application No. 61/447,943, filed on Mar. 1, 2011.

(51) Int. Cl.
H04N 7/173 (2011.01)
H04N 21/2747 (2011.01)
(Continued)

(52) U.S. Cl.
CPC ..... *H04N 21/2747* (2013.01); *H04N 21/23106* (2013.01); *H04N 21/4333* (2013.01); *H04N 21/472* (2013.01); *H04N 21/6587* (2013.01)

(58) Field of Classification Search
None
See application file for complete search history.

(56) References Cited

U.S. PATENT DOCUMENTS 7,017,174 B1    3/2006  Sheedy
8,789,086 B2 *  7/2014  McCoy ............ H04N 21/25875
                                                      725/109

(Continued)

FOREIGN PATENT DOCUMENTS

JP    2004088466 A    3/2004
JP    2007267325 A   10/2007
(Continued)

OTHER PUBLICATIONS

Unknown, Author. "Fix Network Based Timeshift." Ericsson. Open IPTV Forum. 2009.

*Primary Examiner* — Jason K Lin
(74) *Attorney, Agent, or Firm* — Murphy, Bilak & Homiller, PLLC (57) ABSTRACT Methods and apparatuses in a user equipment (300) and a control server (302) for enabling resumption of a paused media information stream sent in a live broadcast (3:1) of a TV program. When a user has paused (3:2) the broadcasted media information stream, the user equipment sends to the control server a request message (3:4) comprising an indicator of the time of pause. The control server then calculates (3:5) an offset value indicating a pause point in the media information stream where the pause occurred, based on the received indicator. The control server sends an answer message (3:6) comprising a file location address of a recorded version of the TV program and the calculated offset value, to the user equipment. The user equipment can then resume the media information stream (3:7, 3:8) from said pause point based on the received file location address and offset value. Thereby, any gap or jump in the resumed TV program due to inaccurate offset can be minimized or avoided.

14 Claims, 3 Drawing Sheets (51) Int. Cl.
*H04N 21/231* (2011.01)
*H04N 21/433* (2011.01)
*H04N 21/472* (2011.01)
*H04N 21/6587* (2011.01)

(56) References Cited

U.S. PATENT DOCUMENTS

2007/0047909 A1\* 3/2007 Toyama et al. ................. 386/95
2010/0030744 A1\* 2/2010 DeShan et al. .................... 707/3
2010/0129050 A1\* 5/2010 Alexander et al. .............. 386/68
2011/0164857 A1\* 7/2011 Foti ............................... 386/241
2013/0031222 A1\* 1/2013 Molander ..................... 709/219

FOREIGN PATENT DOCUMENTS

| JP | 2008311945 A | 12/2008 |
| JP | 2009266270 A | 11/2009 |
| WO | 0193587 A2 | 12/2001 |
| WO | 2008143572 A1 | 11/2008 |

\* cited by examiner

METHODS AND APPARATUSES FOR RESUMING PAUSED MEDIA

TECHNICAL FIELD

The present disclosure relates generally to methods and apparatuses for resuming a paused TV program initially received in a live broadcast and then received as recorded media.

BACKGROUND

Internet Protocol Television (IPTV) offers opportunities for telecom service providers to attract new customers to their networks. With IPTV, telecom service providers can compete with TV offerings from cable operators, satellite-TV operators, and other terrestrial service providers. IPTV also helps providers retain existing customers and prevent churn by introducing a bundled offering of Internet, voice, and IPTV services, sometimes referred to as "triple play".

In IPTV, web-browser technology can be used to enable IPTV Service Providers to provide services of delivering media deployed in communication networks, such as wired and wireless telephone networks. Common web browser applications, such as Mozilla's Firefox and Microsoft's Internet Explorer, enable users to view specific Internet pages and other file locations accessible by the browser. Each such file location is typically identified by a Uniform Resource Identifier (URI) or similar address. In the following, URI will be used to represent a file location address although any other type of address may be used.

In general, IPTV is a technology for receiving and displaying multimedia streams at user IPTV devices, each stream being encoded in a series of IP data packets. A user IPTV device can be a Set-Top Box (STB) or a TV having similar STB capabilities. Such a User Equipment (UE) can be configured to access IPTV services, e.g., via an IP Multimedia System (IMS) of a communication network. In this description, the term "STB" will be used to represent any user IPTV device capable of receiving multimedia streams and displaying the media as TV programs. Further, the term "TV program" is used for any media item delivered from an IPTV provider, such as movies, shows, news and documentaries.

With current solutions for IPTV, it is possible for an STB user to pause a received and viewed live broadcast of a TV program and then resume viewing the program later by receiving a recording of the program stored in the network. This procedure is sometimes called "network time-shift".

Figure 1:
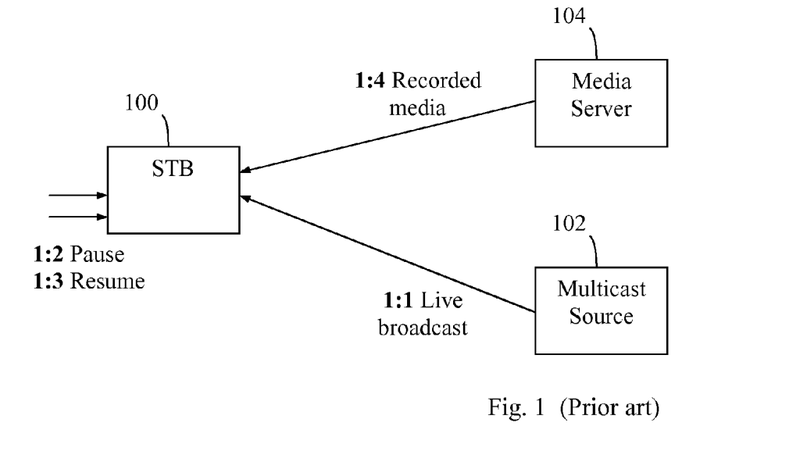
FIG. 1 is a communication scenario illustrating that a live broadcasted TV program is paused and resumed as a recorded program, according to the prior art.

FIG. 1 is a diagram that depicts a communication scenario where the above-described procedure of network time-shift is used. In this scenario, an STB 100 initially receives a multicast media stream of a live program, or live broadcast, from a broadcasting "multicast source" 102, as shown in an action 1:1. At some point during the program, a user of the STB pauses the program in an action 1:2, such that a still picture of the paused position in the program is typically displayed by the STB 100 for the time being.

Later on, the user decides to resume viewing the program and makes a suitable input command on the STB 100 in an action 1:3, e.g. by pressing a play button or the like. The STB 110 then obtains a unicast stream of a recorded version of the remaining part of the program from a "Media Server" 104, in an action 1:4, based on a URI or similar address of the program which has been obtained from an IPTV server, not shown, when the program was paused. The unicast stream that delivers the recording of the paused program from Media Server 104 is thus set up when the user pauses the live program.

In this procedure, it is of course desirable that the program resumes at the point or position where it was paused, to provide a seamless transition of the program at the intermission between the multicast stream from multicast source 102 and the unicast stream from Media Server 104. However, the program is typically resumed with a gap or missing part between the pause position in the live program and the restart position in the recorded program, which is perceived by the user as a "jump" from the paused program, particularly when displayed as a still picture before restart, to the restarted program.

The length of this gap or jump may vary unpredictably, e.g. from less than a second to several seconds, and is therefore unknown to the user. The effect of even only a 200 ms delay is a perceivable jump in the restarted TV program, in particular after displaying a still picture, that prevents a smooth transition from the multicast stream to the unicast stream when a user tries to resume a paused live broadcast. Even in a relatively brief jump, the user may not be able to recognize how much of the program was really missing, particularly if the jump is "abrupt" e.g. occurring over a fast-moving sequence or over a change of scenes. Therefore, a jump of, say, only half a second can be perceived by the user as an unknown gap of several seconds.

SUMMARY

It is an object of the invention to address at least some of the problems and issues outlined above. It is possible to achieve these objects and others by using methods and apparatuses as defined in the attached independent claims.

According to one aspect, a method is provided in a user equipment for resuming a paused media information stream received in a live broadcast of a TV program. In this method, the user equipment obtains an indicator of a pause time in the media information stream indicating the time when a user of the user equipment has paused the broadcasted media information stream. The user equipment then sends a request message comprising the indicator of the pause time to a control server, and receives from the control server an answer message comprising a file location address of a recorded version of the TV program and an offset value. The offset value has been calculated by the control server based on the indicator of the pause time and indicates a pause point in the media information stream where the pause occurred. When a resume input or the like is made by the user, the user equipment resumes the media information stream from the pause point based on the received file location address and offset value. Thereby, it is possible to avoid any gap or jump in the resumed TV program due to inaccurate offset.

According to another aspect, a user equipment is provided, configured to resume a paused media information stream received in a live broadcast of a TV program. The user equipment comprises an obtaining unit adapted to obtain an indicator of a pause time in the media information stream indicating the time when a user of the user equipment has paused the broadcasted media information stream. The user equipment also comprises a communication unit adapted to send a request message comprising the indicator of the pause time to a control server. The communication unit is further adapted to receive from the control server an answer message comprising a file location address of a recorded version of the TV program and an offset value calculated by the control server based on the indicator of the pause time, the offset value indicating a pause point in the media information stream where the pause occurred. The user equipment also comprises a resuming unit adapted to resume the media information stream from the pause point based on the received file location address and offset value.

The above method and user equipment may be configured and implemented according to different optional embodiments. In one possible embodiment, the user equipment resumes the media information stream by retrieving the recorded version from a media server starting at the pause point in the media information stream. The offset value may be a time displacement from a start of the media information stream to the pause point.

In another embodiment, the indicator of a pause time is obtained as a timestamp in the media information stream corresponding to the time of day when the pause occurred in the live broadcast. The user equipment may comprise a Set Top Box, STB and a browser.

According to another aspect, a method is provided in a control server for enabling resumption of a paused media information stream sent in a live broadcast of a TV program. In this method, the control server receives from a user equipment a request message comprising an indicator of a pause time in the media information stream indicating the time when a user of the user equipment has paused the broadcasted media information stream. The control server then calculates an offset value based on the indicator of the pause time, the offset value indicating a pause point in the media information stream where the pause occurred, and sends an answer message comprising a file location address of a recorded version of the TV program and the calculated offset value to the user equipment. Thereby, the user equipment is enabled to resume the media information stream from the pause point based on the received file location address and offset value.

According to yet another aspect, a control server is provided, configured to enable resumption of a paused media information stream sent in a live broadcast of a TV program. The control server comprises a communication unit adapted to receive from a user equipment a request message comprising an indicator of a pause time in the media information stream indicating the time when a user of the user equipment has paused the broadcasted media information stream. The control server also comprises a calculating unit adapted to calculate an offset value based on the indicator of the pause time, the offset value indicating a pause point in the media information stream where the pause occurred. The communication unit is further adapted to send an answer message comprising a file location address of a recorded version of the TV program and the calculated offset value to the user equipment, thereby enabling the user equipment to resume the media information stream from the pause point based on the received file location address and offset value.

The above method and control server may be configured and implemented according to different optional embodiments. In one possible embodiment, the offset value is a time displacement from a start of the media information stream to the pause point requested by the user equipment. The indicator of a pause time may be provided in the received request message as a timestamp in the media information stream. Further, the control server may send the answer message to a browser in the user equipment.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

As mentioned above, when resuming a paused TV program first received as a multicast stream and then as a unicast stream, a gap or "jump" typically occurs between the pause position in the live broadcasted program and the restart position in the recorded program. In order to make the present solution to be described below, the applicant has recognized the reason for this jump transition from the multicast stream to the unicast stream, which will now be explained in more detail with reference to FIG. 2.

Figure 2:
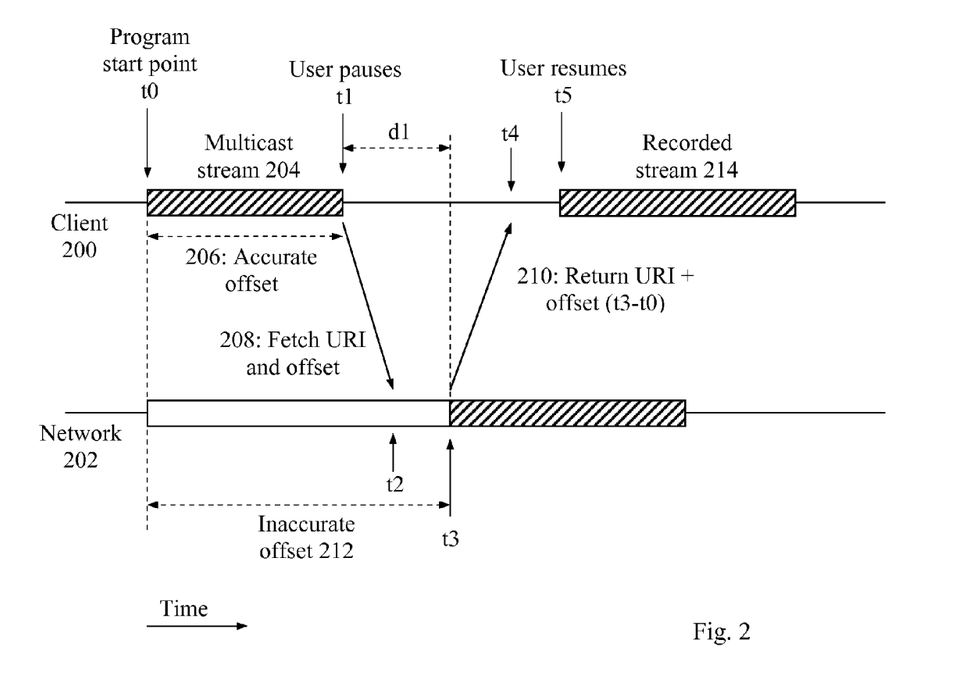
FIG. 2 is a schematic diagram illustrating how a jump occurs when pausing and resuming the TV program of FIG. 1.

FIG. 2 illustrates schematically a procedure for network time-shift as it occurs according to current standards when a paused TV program is resumed, and illustrates also how a jump or missing part can occur in the viewed program in the above example of FIG. 1. In FIG. 2, a timeline at the client side 200, i.e. the STB 100 of FIG. 1, is shown for received and viewed media streams, and another timeline at the network side 202 is shown for media streams as delivered from the multicast source 102 and the media server 104 of FIG. 1. In this example, some useful SIP messages are mentioned for illustration, although any other suitable protocol messages can be used.

As the TV program begins to be broadcasted from the multicast source 102, a multicast stream 204 begins to be received on the client side at a program start point at time t0. At some later point in the TV program, the user pauses the program at a later time t1. The difference between the times t0 and t1 is indicated as an "accurate offset" 206 as perceived on the client side. The pause at the time t1 causes a pause message 208, e.g. in the form of a SIP INVITE message, to be sent by the STB 100 to an IPTV server or the like at network side 202, and that message arrives on the network side at a time t2 that is different from the time t1, i.e. somewhat later. This delay is caused by various propagation and handling of the pause message before arrival on the network side. The pause message 208 is basically a request for a URI and an offset of the TV program, the URI thus pointing to a recorded version of the program in the media server 104 and the offset indicating the point in the program where viewing shall be resumed whenever the user wishes to do so.

After some further processing delay, the network side 202 sends a response message 210, e.g. in the form of a SIP 200 OK message, at a time t3, and that message arrives at the client side 200 at a time t4. The response message includes the URI of the program and a program time offset of t3-t0 which is determined from the network side's point of view, although it is inaccurate from the client side's point of view in that it is not the accurate offset 206 of t1-t0. The time offset of t3-t0 in the response message is thus indicated in the figure as an "inaccurate offset" 212. The user then resumes viewing the program at a time t5 causing the STB 100 to retrieve the remainder of the TV program as a recorded stream 214 from the media server 104, which starts from time t3 instead of t1 according to the received inaccurate offset 212.

As depicted in FIG. 2, the difference between the network side's inaccurate offset 212 and the client side's accurate offset 206 is a duration d1 that is attributable to network delay in propagating and handling the pause message 208. This network delay may thus vary due to varying network conditions and traffic loads. As a result, an incorrect offset is returned to the client side in the response 210 causing the above-described jump or missing part in the viewed program corresponding to d1. In practice, the network delay d1 can be at least 200 milliseconds (ms) or more. In addition, if any of the messages depicted in FIG. 2 is lost or the communication transaction is otherwise not successfully completed, retransmission of one or more messages may be necessary which can delay the network-side response further by as much as 32 seconds (s).

Briefly described, the present solution can be used to avoid the above-described jump and instead provide for a more smooth transition from a multicast stream to a unicast stream when a user of a user equipment, e.g. comprising an STB and a browser, tries to resume a paused live broadcasted TV program.

This can be achieved by providing an indicator of a pause time from the user equipment to a control server, i.e. the time when the user has paused the broadcasted TV program, which indicator can be expressed as the time of day when a pause command was received from the user. Thereby, the control server is able to calculate an accurate offset value based on the pause time indicator, also knowing the start time of the broadcast, the offset value indicating a point in the media information stream where the pause occurred. The offset value may be expressed as a time displacement, i.e. duration, from a start of the media information stream, i.e. start time of the broadcast, to the pause point, e.g. x minutes and y seconds from the start of a TV program.

The control server then returns the offset value to the user equipment along with a file location address, e.g. a URI, of a recorded version of the TV program stored in a media server. The user equipment is thereby able to resume the media information stream from the pause point based on the received offset value and file location address, by fetching the recorded version of the remaining part of the program from the media server.

Figure 3:
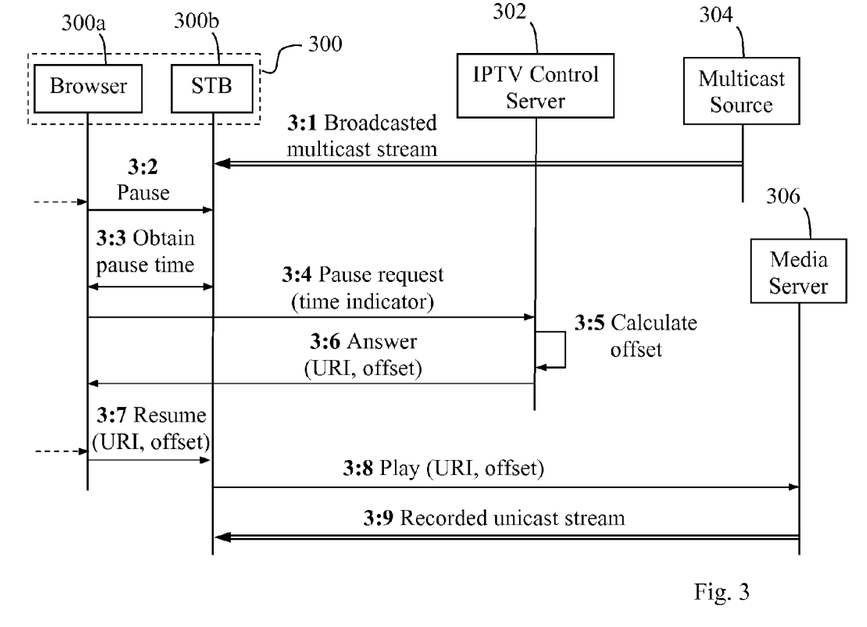
FIG. 3 is a signalling diagram illustrating a procedure for resuming a paused media information stream, according to some possible embodiments.

An example of how a paused media information stream, when received in a live broadcast of a TV program by a user equipment, can be resumed with a smooth transition from the pause to the resumption, will now be described with reference to the signalling diagram in FIG. 3. In this example, the user equipment 300 comprises a browser 300a and an STB 300b although the solution is not limited thereto. The network side involves an IPTV control server 302, a multicast source 304 that broadcasts the media information stream of the TV program at a prescheduled "fixed" time, and a media server 306 that stores a recorded version of the TV program. In this example, SIP signalling may be used although any other suitable protocol messages can also be used, depending on the implementation, and the solution is thus not limited to any particular signalling protocol and messages.

A first action 3:1 illustrates that the multicast source 304 broadcasts the media information stream according to schedule, hence the term "live broadcast", and that the broadcasted media information stream is received and displayed by the user equipment 300. It is assumed that a user watches the TV program basically in real time, i.e. when received and played out by the STB 300b. The procedure for setting up a live broadcast session is well known in the art, which is not shown and described here.

Analogously with the scheme of FIG. 2, the scheduled live broadcast has started at a time t0 and the user pauses the broadcasted media information stream at a time t1, schematically indicated by a first dashed arrow, e.g. by pressing a pause button or the like on a remote control for the browser in the user equipment 300. This causes the browser 300a to send a pause message or the like to the STB 300b, as shown in another action 3:2, wherein the STB 300b stops the reception and display of the broadcasted media information stream for the time being, e.g. by freezing and displaying the last received image as a still picture on the TV screen as long as the pause is maintained. In practice, the STB may send a regular "leave" message or the like, not shown, to the multicast source 302 to stop the stream.

The user equipment 300 then obtains an indicator of a pause time in the media information stream, as shown in a further action 3:3. The indicator of a pause time thus indicates the time t1 when the user has actually paused the broadcasted media information stream as of action 3:2. This can be done in practice by registering the time of day for the pause in the STB 300b upon receiving the pause message in action 3:2, and the browser 300a can then retrieve information on the registered time of day from the STB 300b as the above pause time indicator. Alternatively, the data in the multicast stream may include a time indication which may be used to obtain the indicator of pause time. By way of example, the live broadcast may have started at t0=10:00:00 pm, and the pause may occur at t1=10:30:32, 4 pm, i.e. 30 minutes and 32, 4 seconds past 10 pm.

In a next action 3:4, the browser 300a of user equipment 300 sends a pause request message to the IPTV control server 302 comprising the obtained indicator of the pause time as well as an identifier of the media stream and an identifier of the user. The pause request message of action 3:4 is effectively a fetch command for a file location address, a URI in this example, of the recorded version of the TV program stored in a media server and the above-described offset value indicating a point in the media information stream where the pause occurred.

A further action 3:5 illustrates that the server 302 calculates the offset value based on the pause time indicator received in action 3:4. Using the example times of t0=10:00:00 pm and t1=10:30:32 pm, where the broadcast start time t0 is known in beforehand to the server 302 and t1 is provided from the user equipment 300 as the pause time indicator, the offset value is calculated as t1-t0=30 minutes and 32 seconds, i.e. a time displacement from the start of the media information stream to a time of generating the pause request by the user equipment in action 3:2. The calculated offset value is thus the accurate offset with reference to FIG. 2.

The server 302 then sends an answer to the browser 300a in response to the above pause request message, in a next action 3:6, the answer comprising the calculated offset value and the file location address URI of the recorded version, which information can be used to retrieve the remaining part of the paused TV program from the media server 306. The browser 300a saves the received offset value and file location address URI for later use.

At some point later, the user resumes the paused TV program, e.g. by pressing a play button or the like on the remote control of the user equipment 300, schematically indicated by a second dashed arrow, which causes the browser 300a to send a resume message to the STB 300b, as shown in a further action 3:7. The resume message contains the above received and saved offset value and file location address URI. The STB 300b is then able to restart the media information stream at a point corresponding to the offset value by sending a "play" message to the media server 306 including the offset value and file location address URI, in a next action 3:8, thereby fetching the recorded version of the remainder of the stream from server 306 for playout on the user equipment 300. A final action 3:9 then illustrates that a unicast stream of the recorded version of the remainder is transferred from media server 306 to STB 300b.

In this way, the paused TV program will be resumed from the accurate offset of t1-t0 which is calculated by the server 302 on the network side based on the known broadcast start time t0 and the pause time t1 provided as the pause time indicator from the user equipment 300, instead of resuming it from the inaccurate offset of t3-t0 according to the prior art described above. The transition from the paused TV program to the resumed TV program will thus be smooth, in spite of the fact that the program is received first as a multicast stream from one server 302 and then as a unicast stream from another server 306.

Figure 4:
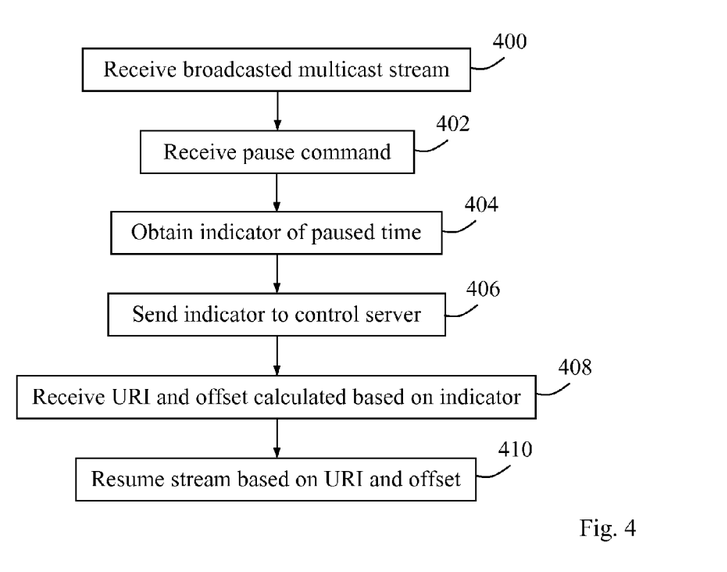
FIG. 4 is a flow chart illustrating a procedure in a user equipment, according to further possible embodiments.

An example of a method with actions performed in a user equipment, for resuming a paused media information stream received in a live broadcast of a TV program, will now be described with reference to the flow chart in FIG. 4. The user equipment in this example may comprise a browser and an STB acting basically as described for FIG. 3 above in communication with a multicast source, a control server and a media server.

A first action 400 illustrates that the user equipment receives the media information stream as a broadcasted multicast stream from the multicast source, basically corresponding to action 3:1 above. In a next action 402, the user equipment receives a pause command from its user, basically corresponding to action 3:2 above, causing the user equipment to stop receiving and displaying the broadcasted multicast stream and it may from that point display a frozen still picture of the last received media information as described in the examples above.

In a further action 404, the user equipment obtains an indicator of a pause time in the media information stream, basically corresponding to action 3:3 above. This pause time indicator thus indicates the time when the user has paused the broadcasted media information stream in action 402. Further, the pause time indicator may be obtained as a timestamp in the media information stream corresponding to the time of day when the pause occurred in the live broadcast.

The user equipment then sends a request message comprising the indicator of the pause time to the control server, as shown by an action 406, basically corresponding to the pause request in action 3:4 above. The request message preferably also comprises an identifier of the media stream and an identifier of the user.

The user equipment receives an answer message from the control server in response to the request message, in a following action 408, basically corresponding to action 3:5 above. The received answer message comprises a file location address of a recorded version of the TV program, a URI in this example, and an offset value that has been calculated by the control server based on the indicator of the pause time sent in action 406. The offset value indicates a pause point in the media information stream where the pause occurred. The offset value may thus be seen as a time displacement from a start of the media information stream to the pause point.

A final action 410 illustrates that, upon receiving a play command or the like from the user, the user equipment resumes the media information stream from the pause point based on the received file location address URI and offset value, basically corresponding to actions 3:7-3:9 above. In this action, the media information stream can be resumed by retrieving a recorded version of the media information stream as a unicast stream from the media server, starting at the pause point in the media information stream.

Figure 5:
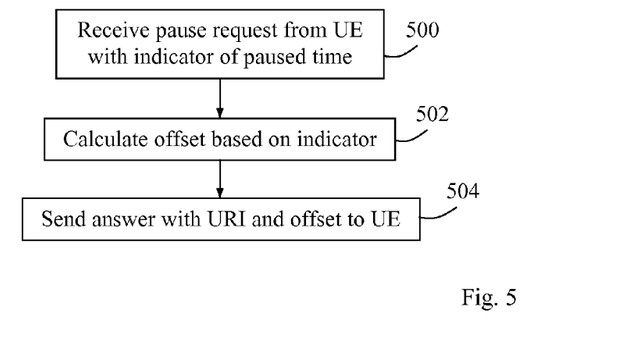
FIG. 5 is a flow chart illustrating a procedure in a control server, according to further possible embodiments.

An example of a method with actions performed in a control server, for enabling resumption of a paused media information stream sent in a live broadcast of a TV program, will now be described with reference to the flow chart in FIG. 5. The control server in this example may be an IPTV control server acting basically as described for FIG. 3 above in communication with a user equipment.

A first action 500 illustrates that the control server receives from the user equipment a request message comprising an indicator of a pause time in the media information stream indicating the time when a user of the user equipment has paused the broadcasted media information stream, basically corresponding to action 3:4 above. Further, the indicator of a pause time may be provided in the request message as a timestamp in the media information stream.

The control server then calculates an offset value based on the indicator of the pause time, in an action 502. The offset value thus indicates a pause point in the media information stream where the pause occurred, basically corresponding to action 3:5 above. The offset value may thus be seen as a time displacement from a start of the media information stream to the pause point requested by the user equipment.

Finally, the control server sends an answer message to the user equipment, in an action 504, the message comprising a file location address of a recorded version of the TV program and the calculated offset value, basically corresponding to action 3:6 above. Thereby, the user equipment is enabled to resume the media information stream from the pause point based on the received file location address and offset value. The answer message may be sent to a browser in the user equipment.

Figure 6:
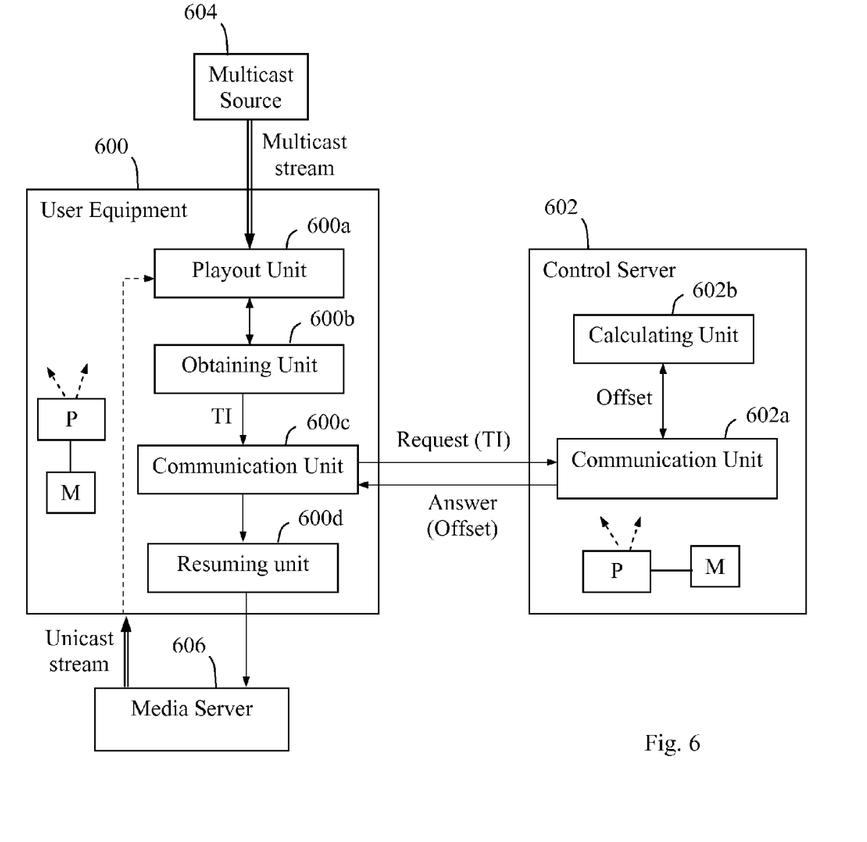
FIG. 6 is a block diagram illustrating examples of a user equipment and a control server in more detail, according to further possible embodiments.

A detailed but non-limiting example of how a user equipment and a control server can be configured to accomplish the above-described solution, is illustrated by the block diagram in FIG. 6. The user equipment 600 is configured to resume a paused media information stream received from a multicast source 604 in a live broadcast of a TV program, while the control server 602 is configured to enable resumption of a paused media information stream sent to the user equipment 600 in the live broadcast of the TV program, e.g. in the manner described above for any of FIGS. 3-5.

The user equipment 600 comprises a playout unit 600a adapted to play out the media information stream received from the multicast source 604. The user equipment 600 also comprises an obtaining unit 600b adapted to obtain an indicator "TI" of a pause time in the media information stream indicating the time when a user of the user equipment pauses the broadcasted media information stream, e.g. using a remote control or other input means of the user equipment 600 to provide a suitable user command, not shown. The user equipment 600 further comprises a communication unit 600c adapted to send a request message comprising the indicator of the pause time to the control server 602.

The control server 602 comprises a communication unit 602a adapted to receive the above request message from the user equipment 600, which message thus comprises the pause time indicator TI. The control server 602 also comprises a calculating unit 602b adapted to calculate an offset value based on the indicator TI of the pause time, the offset value indicating a pause point in the media information stream where the pause occurred.

The communication unit 602a is further adapted to send an answer message comprising a file location address of a recorded version of the TV program and the calculated offset value to the user equipment. The communication unit 600c in user equipment 600 is further adapted to receive from the control server 602 the answer message comprising the file location address and offset value.

The user equipment 600 further comprises a resuming unit 600d adapted to resume the media information stream from the pause point based on the received file location address and offset value. The media information stream can be resumed by the resuming unit 600d retrieving the recorded version as a unicast stream from a media server 606. The user equipment 600 is arranged to input the received unicast stream to the playout unit 600a in a suitable manner, as schematically indicated by a dashed arrow.

The above user equipment 600 and control server 602 and their functional units 600a-d and 602a-b may be configured or adapted to operate according to various optional embodiments. For example, the resuming unit 600d may be further adapted to resume the media information stream by retrieving the recorded version from the media server 606 starting at the pause point in the media information stream. As in the previous examples, the offset value may be a time displacement from a start of the media information stream to the pause point.

The obtaining unit 600b may be further adapted to obtain the indicator of a pause time as a timestamp in the media information stream corresponding to the time of day when the pause occurred in the live broadcast. The user equipment may further comprise a Set Top Box, STB and a browser, e.g. as shown in FIG. 3. The communication unit 602a in the control server may be further adapted to send the answer message to a browser in the user equipment 600.

It should be noted that FIG. 6 merely illustrates various functional units in the user equipment 600 and the control server 602 in a logical sense, although the skilled person is able to implement these functions in practice using suitable software and hardware means. Thus, this aspect of the solution is generally not limited to the shown structures of the user equipment 600 and the control server 602, while their functional units 600a-d and 602a-b may be configured to operate according to the features described for any of FIGS. 3-5 above, where appropriate.

The functional units 600a-d and 602a-b described above can be implemented in the user equipment 600 and the control server 602, respectively, as program modules of a respective computer program comprising code means which, when run by a processor "P" in each of the user equipment 600 and the control server 602 causes them to perform the above-described actions. Each processor P may be a single Central Processing Unit (CPU), or could comprise two or more processing units. For example, the processor P may include general purpose microprocessors, instruction set processors and/or related chips sets and/or special purpose microprocessors such as Application Specific Integrated Circuits (ASICs). The processor P may also comprise a storage for caching purposes.

Each computer program may be carried by a computer program product in either of the user equipment 600 and the control server 602, respectively, in the form of a memory "M" connected to each processor P. The computer program product or memory M comprises a computer readable medium on which the computer program is stored. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the user equipment 600 and the control server 602.

While the solution has been described with reference to specific exemplary embodiments, the description is generally only intended to illustrate the inventive concept and should not be taken as limiting the scope of the solution. For example, the terms "user equipment", "multicast source", "control server", "media server", "TV program", "URI", "request message", "answer message" and "offset" have been used throughout this description, although any other corresponding nodes, functions, and/or parameters could also be used having the features and characteristics described here. The solution is defined by the appended claims.

The invention claimed is:

1. A method in a user equipment for resuming a paused media information stream received in a live broadcast of a TV program, the method comprising:
   obtaining an indicator of a pause time in the media information stream indicating the time when a user of the user equipment has paused the broadcasted media information stream;
   sending a request message comprising said indicator of the pause time to a control server;
   receiving from the control server, responsive to the request message, an answer message comprising a file location address of a recorded version of the TV program and an offset value calculated by the control server based on the indicator of the pause time, the offset value indicating a pause point in the media information stream where the pause occurred, wherein the offset value is a time displacement from a start of the media information stream to said pause point; and
   resuming the media information stream from said pause point based on the received file location address and offset value.

2. The method of claim 1, wherein the media information stream is resumed by retrieving said recorded version from a media server, starting at said pause point in the media information stream.

3. The method of claim 1, wherein the indicator of a pause time is obtained as a timestamp in the media information stream corresponding to the time of day when the pause occurred in said live broadcast.

4. The method of claim 1, wherein the user equipment comprises a Set Top Box (STB) and a browser.

5. A user equipment configured to resume a paused media information stream received in a live broadcast of a TV program, comprising:
   an obtaining unit adapted to obtain an indicator of a pause time in the media information stream, the indicator indicating the time when a user of the user equipment has paused the broadcasted media information stream;
   a communication unit adapted to send a request message comprising said indicator of the pause time to a control server, and further adapted to receive from the control server, responsive to the request message, an answer message comprising a file location address of a recorded version of the TV program and an offset value calculated by the control server based on the indicator of the pause time, the offset value indicating a pause point in the media information stream where the pause occurred, wherein the offset value is a time displacement from a start of the media information stream to said pause point; and a resuming unit adapted to resume the media information stream from said pause point based on the received file location address and offset value.

6. The user equipment of claim 5, wherein the resuming unit is further adapted to resume the media information stream by retrieving said recorded version from a media server starting at said pause point in the media information stream.

7. The user equipment of claim 5, wherein the obtaining unit is further adapted to obtain the indicator of a pause time as a timestamp in the media information stream corresponding to the time of day when the pause occurred in said live broadcast.

8. The user equipment of claim 5, wherein the user equipment comprises a Set Top Box (STB) and a browser.

9. A method in a control server for enabling resumption of a paused media information stream sent in a live broadcast of a TV program, the method comprising:
receiving from a user equipment a request message comprising an indicator of a pause time in the media information stream, the indicator indicating the time when a user of the user equipment has paused the broadcasted media information stream;
calculating an offset value based on said indicator of the pause time, the offset value indicating a pause point in the media information stream where the pause occurred, wherein the offset value is a time displacement from a start of the media information stream to said pause point requested by the user equipment; and
sending, responsive to the request message, an answer message comprising a file location address of a recorded version of the TV program and the calculated offset value to the user equipment, thereby enabling the user equipment to resume the media information stream from said pause point based on the received file location address and offset value.

10. The method of claim 9, wherein the indicator of a pause time is provided in the request message as a timestamp in the media information stream.

11. The method of claim 9, wherein the answer message is sent to a browser in the user equipment.

12. A control server configured to enable resumption of a paused media information stream sent in a live broadcast of a TV program, the control server comprising:
a communication unit adapted to receive from a user equipment a request message comprising an indicator of a pause time in the media information stream, the indicator indicating the time when a user of the user equipment has paused a broadcasted media information stream; and
a calculating unit adapted to calculate an offset value based on said indicator of the pause time, the offset value indicating a pause point in the media information stream where the pause occurred, wherein the offset value is a time displacement from a start of the media information stream to said pause point requested by the user equipment;
wherein the communication unit is further adapted to send an answer message comprising a file location address of a recorded version of the TV program and the calculated offset value to the user equipment, thereby enabling the user equipment to resume the media information stream from said pause point based on the received file location address and offset value.

13. A control server according to claim 12, wherein the indicator of a pause time is provided in the request message as a timestamp in the media information stream.

14. A control server according to claim 12, wherein the communication unit is further adapted to send the answer message to a browser in the user equipment.

* * * * *